United States Patent
Kanno

(10) Patent No.: US 8,634,772 B2
(45) Date of Patent: Jan. 21, 2014

(54) COMMUNICATIONS DEVICE, RESONANT CIRCUIT, AND METHOD OF APPLYING CONTROL VOLTAGE

(75) Inventor: Masayoshi Kanno, Kanagawa (JP)

(73) Assignee: Sony Corporation, Tokyo (JP)

( * ) Notice: Subject to any disclaimer, the term of this patent is extended or adjusted under 35 U.S.C. 154(b) by 1 day.

(21) Appl. No.: 13/416,903

(22) Filed: Mar. 9, 2012

(65) Prior Publication Data
US 2012/0252391 A1 Oct. 4, 2012

(30) Foreign Application Priority Data

Mar. 30, 2011 (JP) ................. 2011-074937

(51) Int. Cl.
*H04B 5/00* (2006.01)
*G08B 13/14* (2006.01)
(52) U.S. Cl.
USPC ....................... 455/41.1; 340/572.5
(58) Field of Classification Search
USPC ............ 455/41.1, 41.2, 39; 340/572.5, 572.7, 340/10.1; 343/700 R
See application file for complete search history.

(56) References Cited

U.S. PATENT DOCUMENTS

| | | | |
|---|---|---|---|
| 7,786,863 B2 * | 8/2010 | Koyama | 340/572.1 |
| 7,817,094 B2 * | 10/2010 | Adachi et al. | 343/702 |
| 8,035,255 B2 * | 10/2011 | Kurs et al. | 307/104 |
| 2008/0252549 A1 * | 10/2008 | Ohtaki et al. | 343/861 |

FOREIGN PATENT DOCUMENTS

| | | |
|---|---|---|
| JP | 2001-77437 | 3/2001 |
| JP | 2001-077437 | 3/2001 |
| JP | 2008-199536 | 8/2008 |
| JP | 2010-040249 | 2/2010 |

* cited by examiner

*Primary Examiner* — Sonny Trinh
(74) *Attorney, Agent, or Firm* — Sony Corporation

(57) ABSTRACT

A communications device includes a resonant antenna including a variable capacitance element having a dielectric unit formed of a ferroelectric material, and performing non-contact communications with the outside; and a control voltage generation unit generating a control voltage for controlling capacitance of the variable capacitance element, applying the generated control voltage to the dielectric unit of the variable capacitance element, and inverting an application direction of the control voltage applied to the dielectric unit at a predetermined rate.

17 Claims, 11 Drawing Sheets

FIG. 15

| DC1 (V) | DC2 (V) | CONTROL VOLTAGE (V) IN POSITIVE CONDITIONS |
|---|---|---|
| 0 | 0 | 0 |
| 0.1 | 0 | 0.1 |
| 0.2 | 0 | 0.2 |
| 0.3 | 0 | 0.3 |
| 0.4 | 0 | 0.4 |
| 0.5 | 0 | 0.5 |
| 0.6 | 0 | 0.6 |
| 0.7 | 0 | 0.7 |
| 0.8 | 0 | 0.8 |
| 0.9 | 0 | 0.9 |
| 1 | 0 | 1 |
| 1.1 | 0 | 1.1 |
| 1.2 | 0 | 1.2 |
| 1.3 | 0 | 1.3 |
| 1.4 | 0 | 1.4 |
| 1.5 | 0 | 1.5 |
| 1.6 | 0 | 1.6 |
| 1.7 | 0 | 1.7 |
| 1.8 | 0 | 1.8 |
| 1.9 | 0 | 1.9 |
| 2 | 0 | 2 |
| 2.1 | 0 | 2.1 |
| 2.2 | 0 | 2.2 |
| 2.3 | 0 | 2.3 |
| 2.4 | 0 | 2.4 |
| 2.5 | 0 | 2.5 |
| 2.6 | 0 | 2.6 |
| 2.7 | 0 | 2.7 |
| 2.8 | 0 | 2.8 |
| 2.9 | 0 | 2.9 |
| 3 | 0 | 3 |

FIG. 16

| DC1 (V) | DC2 (V) | CONTROL VOLTAGE (V) IN NEGATIVE CONDITIONS |
|---|---|---|
| 0 | 3 | -3 |
| 0.1 | 3 | -2.9 |
| 0.2 | 3 | -2.8 |
| 0.3 | 3 | -2.7 |
| 0.4 | 3 | -2.6 |
| 0.5 | 3 | -2.5 |
| 0.6 | 3 | -2.4 |
| 0.7 | 3 | -2.3 |
| 0.8 | 3 | -2.2 |
| 0.9 | 3 | -2.1 |
| 1 | 3 | -2 |
| 1.1 | 3 | -1.9 |
| 1.2 | 3 | -1.8 |
| 1.3 | 3 | -1.7 |
| 1.4 | 3 | -1.6 |
| 1.5 | 3 | -1.5 |
| 1.6 | 3 | -1.4 |
| 1.7 | 3 | -1.3 |
| 1.8 | 3 | -1.2 |
| 1.9 | 3 | -1.1 |
| 2 | 3 | -1 |
| 2.1 | 3 | -0.9 |
| 2.2 | 3 | -0.8 |
| 2.3 | 3 | -0.7 |
| 2.4 | 3 | -0.6 |
| 2.5 | 3 | -0.5 |
| 2.6 | 3 | -0.4 |
| 2.7 | 3 | -0.3 |
| 2.8 | 3 | -0.2 |
| 2.9 | 3 | -0.1 |
| 3 | 3 | 0 |

COMMUNICATIONS DEVICE, RESONANT CIRCUIT, AND METHOD OF APPLYING CONTROL VOLTAGE

CROSS REFERENCES TO RELATED APPLICATIONS

The present application claims priority to Japanese Priority Patent Application JP 2011-074937 filed in the Japan Patent Office on Mar. 30, 2011, the entire content of which is hereby incorporated by reference.

BACKGROUND

The present disclosure relates to a communications device having a function of adjusting a resonant frequency of a resonant antenna through application of a control voltage to a variable capacitance element, a resonant circuit, and a method of applying the control voltage.

Recently, communications devices, for example, such as non-contact IC (Integrated Circuit) cards used as traffic tickets and electronic money, and information processing terminals having equivalent functions to the non-contact IC cards, have become significantly widespread. In such a communications device, a transmission signal (electromagnetic waves) emitted from a transmitting antenna of a dedicated reader/writer (hereinafter written as "R/W") device is received by the action of electromagnetic induction in a receiving antenna (resonant circuit) installed inside the communications device.

In the communications device having the above-described non-contact communications function, traditionally, techniques, in which a variable capacitor (variable capacitance element) is provided in a receiving antenna and a resonant frequency of the receiving antenna is adjusted, have been proposed. Further, as such a variable capacitor, for example, a variable-capacitance diode that is called a varicap or a variable capacitor using a ferroelectric material is used.

Further, traditionally, in the resonant antenna having the above-described variable capacitor, various techniques for improving the receiving characteristics have been proposed (for example, see Japanese Patent Application No. 2008-199536 and Japanese Unexamined Patent Application Publication No. 2001-77437).

Japanese Patent Application No. 2008-199536 proposes a technique of improving communications null characteristics through feedback of a DC voltage that is generated based on a signal received from a resonant antenna to a variable capacitor that constitutes a resonant circuit in a non-contact communications device.

Japanese Unexamined Patent Application Publication No. 2001-77437 proposes a technique for eliminating the influence of hysteresis characteristics (control voltage application history characteristics) of a variable capacitor using a ferroelectric material.

By applying a control voltage to a variable capacitor using a ferroelectric material, the capacitance of the variable capacitor is changed. However, the capacitance of the variable capacitor using the ferroelectric material is not determined only by the control voltage that is currently applied, but is affected by the past control voltage application history (hysteresis characteristics). More specifically, the capacitance change characteristics versus control voltage of the variable capacitor when the control voltage is increased from 0 V to a predetermined voltage Vcc differ from those when the control voltage is decreased from the predetermined voltage Vcc to 0 V.

According to Japanese Unexamined Patent Application Publication No. 2001-77437, in order to eliminate the influence of such hysteresis characteristics, the control voltage that is equal to or higher than a saturation voltage of the variable capacitor is once applied to the variable capacitor, and then the variable capacitor is controlled.

SUMMARY

Incidentally, in the technical field of a communications device having a non-contact communications function, and particularly, having a resonant antenna including a variable capacitance element using a ferroelectric material, it is desirable to develop a technology that can stably control a resonant frequency of the resonant antenna for an extended period of time.

The present disclosure has been made to meet the above requirements. It is further desirable to provide a communications device, a resonant circuit, and a method of applying a control voltage, which can stably control a resonant frequency of a resonant antenna having a variable capacitance element using a ferroelectric material for an extended period of time.

According to an embodiment of the present disclosure, there is provided a communications device which includes a resonant antenna and a control voltage generation unit, and the respective units are configured as follows. The resonant antenna includes a variable capacitance element having a dielectric unit formed of a ferroelectric material, and performs non-contact communications with the outside. The control voltage generation unit generates a control voltage for controlling capacitance of the variable capacitance element, applies the generated control voltage to the dielectric unit of the variable capacitance element, and inverts an application direction of the control voltage applied to the dielectric unit at a predetermined rate.

According to another embodiment of the present disclosure, there is provided a resonant circuit which includes a variable capacitance element and a control voltage generation unit, and the respective units are configured as follows. The variable capacitance element has a dielectric unit formed of a ferroelectric material. The control voltage generation unit generates a control voltage for controlling capacitance of the variable capacitance element, applies the generated control voltage to the dielectric unit of the variable capacitance element, and inverts an application direction of the control voltage applied to the dielectric unit at a predetermined rate.

According to still another embodiment of the present disclosure, there is provided a method of applying a control voltage that is a method of applying a control voltage in the communications device according to the embodiment of the present disclosure, and performs the following steps. First, a control voltage generation unit applies a first control voltage to a dielectric unit in a predetermined direction. Next, the control voltage generation unit applies a second control voltage through inverting an application direction of the control voltage at a predetermined rate after applying the first control voltage in the predetermined direction.

As described above, according to the present disclosure, the control voltage generation unit inverts the application direction of the control voltage that is applied to the variable capacitance element at the predetermined rate. In this way, according to the present disclosure, the capacitance of the variable capacitance element is stably controlled for an extended period of time. Accordingly, according to the present disclosure, the resonant frequency of the resonant antenna having the variable capacitance element using the ferroelectric material can be stably controlled for an extended period of time.

Additional features and advantages are described herein, and will be apparent from the following Detailed Description and the figures.

BRIEF DESCRIPTION OF THE FIGURES

FIG. 15 is a diagram illustrating a method of varying a control voltage according to modified example 2;

FIG. 16 is a diagram illustrating a method of varying a control voltage according to modified example 2.

DETAILED DESCRIPTION

Figure 1:
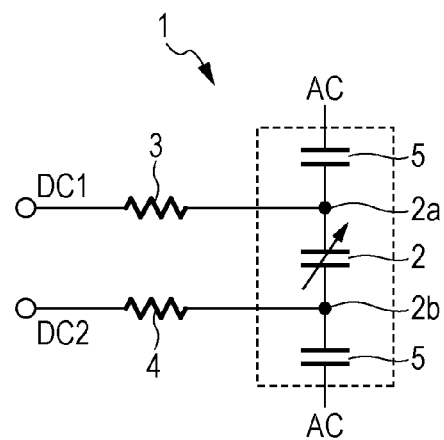
FIG. 1 is a schematic circuit diagram of a measurement system that is used in various kinds of verification tests.

Hereinafter, examples of a communications device, a resonant circuit, and a method of applying a control voltage to a variable capacitance element according to embodiments of the present disclosure will be described with reference to the accompanying drawings in the following sequence. However, the present disclosure is not limited to the following examples.

1. An application technique of a control voltage to a variable capacitor
2. Configuration examples of a communications device and a resonant circuit
3. Various kinds of modified examples <1. An Application Technique of a Control Voltage to a Variable Capacitor>

First, before explaining the principle of an application technique of a control voltage to a variable capacitor (variable capacitance element) according to the resent disclosure, properties of a variable capacitor using a ferroelectric material and problems that occurs due to the properties will be described.

[Properties and Problems of a Variable Capacitor Using a Ferroelectric Material]

A varicap that is commonly used as a variable capacitor has polarity (voltage application direction is fixed) and low withstand voltage. By contrast, a variable capacitor using a ferroelectric material has no polarity, high withstand voltage, and high degree of freedom in setting the capacitance.

However, the variable capacitor using the ferroelectric material has the above-described hysteresis or capacitance aging property due to its ferroelectricity. The capacitance aging is the property in which the capacitance of a variable capacitor is decreased through just leaving the variable capacitor as it stands, the capacitance is changed through continuous application of the control voltage, or the capacitance is changed through returning of the control voltage to 0 V. If there is an influence of such capacitance aging, not only the capacitance of the variable capacitor but also the variable width thereof is changed.

That is, the variable capacitor using the ferroelectric material has the drawback in that the influence of the hysteresis characteristic (past control voltage application history characteristic) as the variable characteristic of the capacitance is large, and the capacitance is decreased due to the capacitance aging characteristic (hereinafter, referred to as the "aging characteristic"). Further, this type of variable capacitor has the drawback in that the capacitance change with temperature is large.

The drawback based on the peculiar properties (hysteresis, capacitance aging, and the like) of the ferroelectric material becomes barriers to the stability control of a resonant frequency of a resonant antenna by the variable capacitor. Accordingly, in the resonant antenna having the variable capacitor using the ferroelectric material, it is important to operate the variable capacitor with stable capacitance for an extended period of time.

Although Japanese Unexamined Patent Application Publication No. 2001-77437 proposes countermeasures against the hysteresis of the variable capacitor, there is a possibility that the capacitance of the variable capacitor is changed by the level of voltage that is applied to the variable capacitor and the application time in this approach. Accordingly, in terms of stably controlling the resonant frequency through the variable capacitor, the technique of Japanese Unexamined Patent Application Publication No. 2001-77437 may not be sufficient.

[Influence of a Standby Method]

If a variable capacitor using a ferroelectric material is applied in a communications device having a non-contact communications function, the influence of the aging characteristic of the variable capacitor is changed by a control method in which a received signal is in a standby state (hereinafter referred to as a "standby method").

Here, Table 1 below shows characteristics and differences between standby methods commonly used in the communications device. Further, Table 1 shows an example of a communications device having a resonant frequency of 13.56 MHz of a resonant antenna during reception of signal 1. Further, in an example shown in Table 1, if a control voltage is applied to the variable capacitor, the capacitance of the variable capacitor is deteriorated to heighten the resonant frequency.

TABLE 1

| | Standby | | | Used |
|---|---|---|---|---|
| | Voltage (V) | Power (nW) | Frequency (MHz) | Accumulated Time (H) |
| V_MIN | 0 | 0 | 13.10 | 1311 |
| V_CENTER | 1.5 | 90 | 13.50 | 26280 |
| VMAX | 3 | 900 | 13.90 | 26280 |

Standby methods may include a method in which the control voltage is not applied to the variable capacitor ("V_MIN" in Table 1), and a method in which a predetermined voltage is applied as the control voltage ("V_CENTER" and "V_MAX" in Table 1). Further, the method of applying the control voltage may include a method of applying a maximum voltage (3 V) ("V_MAX" in Table 1) and a method of applying a predetermined voltage except for the maximum voltage. Although Table 1 shows an example of a method of applying a voltage that is ½ of the maximum voltage (3 V)(center voltage: 1.5 V) as the method of applying the predetermined voltage except for the maximum voltage, the control voltage may be applied so that the resonant frequency of the resonant circuit becomes a preset standby frequency. In the rightmost column of Table 1, an accumulated value (accumulated time) of the application time of the control voltage in the case of continuing to use the communications device for three years is shown. Further, the accumulated time of the control voltage in the standby method ("V_MIN" in Table 1) in which the control voltage is not applied to the variable capacitor becomes a value in the case where communications are performed 18 times a day and during the communications, the control voltage is applied for one second.

The standby method ("V_MIN") in which the control voltage is not applied to the variable capacitor, for example, is a standby method that is used in a communications device such as a non-contact IC card that is not provided with the power. In this standby method, the control power that is consumed during a standby state is "0". Further, in this standby method, as shown in Table 1, the total amount of communications time becomes the accumulated time for which the control voltage is applied. Accordingly, in this standby method, the application time (28 hours) of the control voltage against the used time (three years) of the communications device is very short, and the influence of the aging characteristic of the variable capacitor becomes minimized.

Further, as shown in Table 1, in the standby method in which the control voltage is not applied to the variable capacitor, the resonant frequency in the standby state is 13.10 MHz, and becomes lower than the system frequency (13.56 MHz) during the signal reception.

In the standby method, a carrier of 13.56 MHz that is transmitted from an external R/W to the non-contact IC card is received, and a DC voltage that is generated by rectifying the received carrier through a rectifying circuit is supplied to an RF (Radio Frequency) IC or the like in the non-contact IC card as the power. Next, the control voltage that is generated from the received signal through a control circuit is applied to the variable capacitor to make an optimum communications state (resonant frequency), and by this, the communications null is avoided. Further, in addition to the avoidance of the communications null, there are multiple purposes of changing the resonant frequency, such as maximization of the communications distance, receiving level down due to detuning for IC protection, and the like.

On the other hand, the standby method ("V_CENTER and "V_MAX") in which a predetermined control voltage is applied to the variable capacitor, for example, is a standby method that is used in a communications device such as a mobile phone having the non-contact communications function and the power.

In the standby method ("V_CENTER") in which the control voltage of the center voltage (1.5 V) is applied to the variable capacitor, as shown in Table 1, the resonant frequency during the standby state becomes 13.50 MHz, which is almost the same as the system frequency (13.56 MHz). In this case, it is possible to detect the carrier from a farther place, and thus the communications distance is extended. However, in this standby method, the accumulated time of the application time of the control voltage becomes equal to the used time of the communications device. Accordingly, in this standby method, the power consumption is increased and the influence of the aging characteristic of the variable capacitor becomes larger in comparison to the standby method ("V_MIN") in which the control voltage is not applied.

Further, in the standby method ("V_CENTER") in which the control voltage of the maximum voltage (3.0 V) is applied to the variable capacitor, as shown in Table 1, the resonant frequency during the standby state becomes 13.90 MHz, which is higher than the system frequency (13.56 MHz). In this method, the accumulated time of the application time of the control voltage becomes equal to the used time of the communications device and the power consumption is increased. However, since the magnitude of current that leaks from the variable capacitor, which occurs during the applying of the control voltage is not in proportion to the magnitude of the control voltage, the power consumption in this standby method becomes greatly larger than that in the standby method ("V_CENTER") in which the control voltage of the center voltage is applied. Further, in this standby method, the maximum voltage is applied to the variable capacitor, and the influence of the aging characteristic of the variable capacitor becomes the greatest. However, according to the circuit design, since the minimum value (0.0 V) and the maximum value (3.0 V) of the supply voltage can be easily generated even in the case where the system LSI is in a standby state, this standby method has the advantage of low cost.

As described above, due to the differences in standby methods of the communications device, the influence of the aging characteristic of the variable capacitor is changed, and thus the stability of the capacitance of the variable capacitor is also changed.

[Verification Test]

In order to specifically verify the properties and problems of the variable capacitor using the ferroelectric material, various verification tests were actually conducted, and the capacitance change of the variable capacitor due to the control voltage application was investigated.

(1) Measurement System.

FIG. 1 shows a circuit configuration of a measurement system that is used in various kinds of verification tests to be described hereinafter. In a measurement system 1, a first control voltage signal DC1 is input to one terminal (a first control terminal 2a) of a variable capacitor 2 using a ferroelectric material through a resistor 3. Further, a second control voltage signal DC2 is input to the other terminal (second control terminal 2b) of the variable capacitor 2 through a resistor 4. That is, in the measurement system 1, the control voltage for verification that is applied to the variable capacitor 2 is generated by two signal pulses of the first control voltage signal DC1 and the second control voltage signal DC2.

Further, in the measurement system 1, both terminals of the variable capacitor 2 are connected to an impedance analyzer (not illustrated) through a CD-cut capacitor 5 having a sufficiently large capacitance. The DC-cut capacitor 5 is installed to prevent current from leaking to the impedance analyzer side when the control voltage for verification is applied to the variable capacitor 2.

Further, in FIG. 1, in order to simplify the description, it is exemplified that the variable capacitor 2 is a two-terminal type variable capacitor having a connection terminal that is connected to the DC-cut capacitor 5 and a common control terminal. However, the variable capacitor 2 that is used in the measurement system 1 may be a four-terminal type variable capacitor having two connection terminals that are connected to the DC-cut capacitor 5 and two control terminals (a first control terminal 2a and a second control terminal 2b) that are separately provided.

Here, in order to eliminate the influence of ambient temperature, the measurement system 1 was arranged in a thermostatic bath having a constant temperature of 25° C., and the following verification tests were performed.

(2) Verification Test 1

In verification test 1, first, in the measurement system 1, a first verification control voltage composed of an AC signal of 0.5 Vrms (bias voltage of 0 V) was applied to the variable capacitor 2 for 4 hours, and the time-dependent change of the capacitance of the variable capacitor 2 was measured. Further, in the verification test 1, a second verification control voltage composed of an AC signal of 0.5 Vrms+bias voltage of 3 V was applied to the variable capacitor 2 for 4 hours, and the time-dependent change of the capacitance of the variable capacitor 2 was measured. Further, the method of applying the second verification control voltage corresponds to the standby method of "V_MAX" in Table 1.

Figure 2:
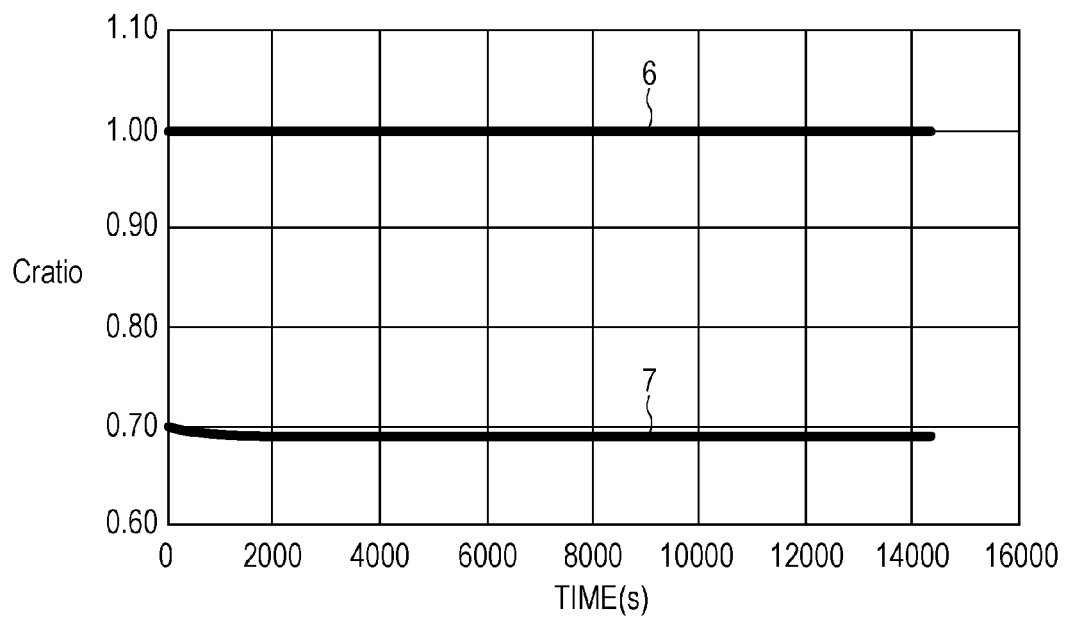
FIG. 2 is a diagram illustrating a measurement result of verification test 1.

The result of the verification test 1 is shown in FIG. 2. FIG. 2 is a characteristic diagram illustrating the capacitance change of the variable capacitor 2 for the application time of each verification control voltage. The horizontal axis of the characteristics shown in FIG. 2 represents the application time of each verification control voltage, and the vertical axis represents a relative value of capacitance of the variable capacitor 2 (capacitance ratio Cratio) if it is assumed that the capacitance when the application of each verification control voltage starts is "1". Further, the characteristic 6 in FIG. 2 is the capacitance change characteristic when the first verification control voltage (AC signal of 0.5 Vrms+bias voltage of 0 V) is applied to the variable capacitor 2. Further, the characteristic 7 in FIG. 2 is the capacitance change characteristic when the second verification control voltage (AC signal of 0.5 Vrms+bias voltage of 3 V) is applied to the variable capacitor 2.

When the first verification control voltage is applied to the variable capacitor 2, as illustrated as the characteristic 6 in FIG. 2, the capacitance ratio Cratio is gradually decreased with the lapse of time. However, the reduction rate of the capacitance ratio Cratio in the characteristic 6 is about 0.1%, and is negligible.

Further, when the second verification control voltage is applied to the variable capacitor 2 (characteristic 7), in the same manner as the characteristic 6, the capacitance ratio Cratio is gradually decreased with the lapse of time. However, in this case, as illustrated in FIG. 2, the capacitance ratio Cratio is greatly reduced when the application of the second verification control voltage starts, and thereafter, the gradually reduced characteristic can be obtained. Further, the reduced amount of capacitance in the characteristic 7 becomes larger that than in the characteristic 6.

From the above-described verification test 1, it can be known that if the control voltage is continuously applied to the variable capacitors 2 using the ferroelectric material, the capacitance of the variable capacitor 2 is lowered with the lapse of time. This is considered to be caused by the influence of the aging characteristic of the variable capacitor 2.

(3) Verification Test 2

Next, in the measurement system 1 illustrated in FIG. 1, the capacitance change of the variable capacitor 2 when a pulse signal (control voltage) of a duty rate of 50% was continuously applied to the variable capacitor 2 was investigated (verification test 2). The method of applying the control voltage in the verification test 2 corresponds to the standby method ("V_MIN" in Table 1) in which the control voltage is not applied to the variable capacitor 2.

Figure 3:
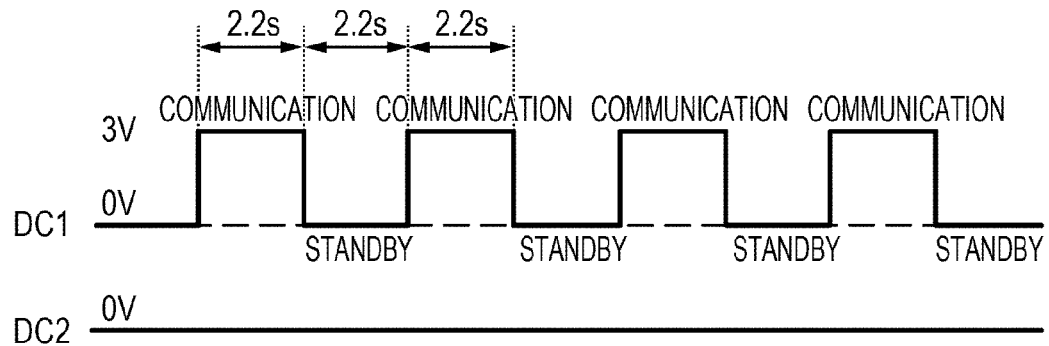
FIG. 3 is a diagram illustrating an example of signal waveforms of a first control voltage signal and a second control voltage signal used in verification test 2.

FIG. 3 shows an example of signal waveforms of a first control voltage signal DC1 that is applied to a first control terminal 2a of the variable capacitor 2 and a second control voltage signal DC2 that is applied to a second control terminal 2b in the verification test 2. Although not illustrated in FIG. 1, the variable capacitor 2 has a dielectric layer (dielectric unit) formed of a ferroelectric material, and the first control terminal 2a and the second control terminal 2b are arranged so that the dielectric layer is sandwiched between them in the thickness direction of the dielectric layer (see FIG. 11 to be described hereinafter).

In the verification test 2, as the first control voltage signal DC1, a pulse signal having an amplitude of 3 V, a pulse width of 2.2 sec, and a pulse period of 4.4 sec is used. Further, as the second control voltage signal DC2, a constant signal of 0 V is used. In the verification test 2, a pulse signal (control voltage) having a duty rate of 50% is generated by the two signals. In this case, as illustrated in FIG. 3, a period in which a DC pulse voltage having an amplitude of 3 V is applied in the first control voltage signal DC1 corresponds to the communications period, and other periods correspond to the standby period.

Hereinafter, the application condition of the control voltage in the case where the DC pulse voltage is applied to the first control terminal 2a of the variable capacitor 2 is called a "positive condition". In the positive condition, the application direction of the control voltage is a direction that is directed from the first control terminal 2a to the second control terminal 2b in the thickness direction of the dielectric layer (not illustrated) of the variable capacitor 2.

In the verification test 2, the first control voltage signal DC1 and the second control voltage signal DC2 illustrated in FIG. 3 were applied to the variable capacitor 2 for 4 hours. Then, when the application of the control voltage started and when four hours elapsed after the application, the capacitance of the variable capacitor 2 was measured in the case of the control voltage of 3 V (during communication) and in the case of the control voltage of 0 V (during standby state). Further, in the verification test 2, since the DC pulse voltage is applied to the variable capacitor 2 about 3300 times for 4 hours, the integrated value of the application time of the control voltage of 3 V becomes two hours.

Figure 4:
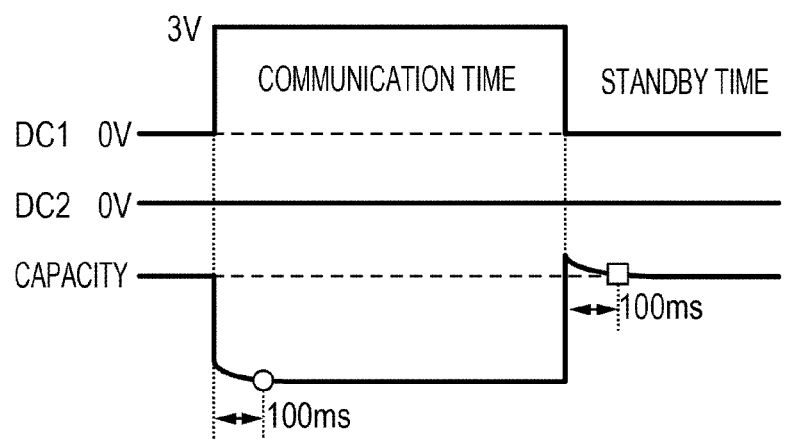
FIG. 4 is a diagram illustrating a method of measuring the capacitance of a variable capacitor when a control voltage is 3 V and when the control voltage is 0 V.

FIG. 4 shows the outline of the measurement method when the capacitance of the variable capacitor 2 is measured in the case of the control voltage of 3 V (during communication) and in the case of the control voltage of 0 V (during the standby state) in the verification test 2. Typically, in the variable capacitor 2 using the ferroelectric material, if the control voltage is applied, the capacitance of the variable capacitor 2 is decreased. Accordingly, as illustrated in FIG. 4, when the DC pulse voltage of the first control voltage signal DC1 is applied, the capacitance is decreased. However, as illustrated in FIG. 4, during the on/off switching of the first control voltage signal DC1 (DC pulse voltage), the change of the capacitance becomes the transient response. Accordingly, in the verification test 2, the capacitance is measured in the timing in which the capacitance change is substantially constant.

Specifically, the capacitance value after 100 Msec from the first pulse start time of the first control voltage signal DC1 (a balloon in FIG. 4) was determined as the capacitance value in the case of the control voltage of 3 V (during communication). Further, the capacitance value after 100 Msec from the pulse cutoff time of the first control voltage signal DC1 (a square mark in FIG. 4) was determined as the capacitance value in the case of the control voltage of 0 V (during the standby state). Further, the reason why the pulse width of the first control voltage signal DC1 is set to 2.2 sec is to consider the capacitance measurement time or the like.

In the above-described positive condition, the measurement result of the capacitance change of the variable capacitor 2 in the case where the control voltage (the first control voltage signal DC1 and the second control voltage signal DC2) having a duty rate of 50% is continuously applied to the variable capacitor 2 for 4 hours is shown in Table 2 below.

TABLE 2

| Positive Condition | At start-up | After 4 hours | Δ | Δ/Cratio |
|---|---|---|---|---|
| 0 V | 1.000 | 0.970 | 0.030 | |
| 3 V | 0.627 | 0.643 | −0.015 | |
| Cratio | 0.627 | 0.662 | −0.035 | −0.05587 |

Figure 5:
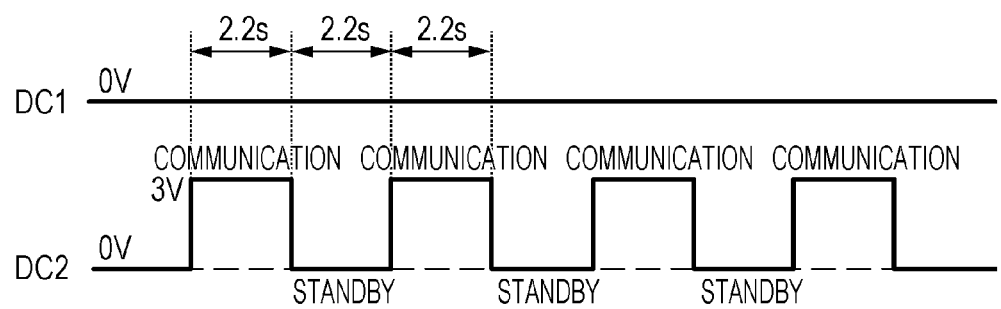
FIG. 5 is a waveform diagram of a first control voltage signal and a second control voltage signal used in verification test 2.

Further, in the verification test 2, even in the case where the first control voltage signal DC1 was set to a constant signal of 0 V, and the second control voltage signal DC2 was set to a pulse signal having an amplitude of 3 V, a pulse width of 2.2 sec, and a pulse period of 4.4 sec, the capacitance change of the variable capacitor 2 was measured. FIG. 5 shows an example of signal waveforms of the first control voltage signal DC1 and the second control voltage signal DC2.

Further, in the case of applying a DC pulse voltage to the second control terminal 2b of the variable capacitor 2, the application direction of the control voltage in the case of the control voltage of 3 V (during communication) is opposed to the application direction of the control voltage in the above-described positive condition. That is, the application direction of the control voltage becomes a direction that is directed from the second control terminal 2b to the first control terminal 2a in the thickness direction of the dielectric layer (not illustrated) of the variable capacitor 2. Accordingly, hereinafter, the application condition of the control voltage in the case of applying the DC pulse voltage to the second control terminal 2b of the variable capacitor 2 is called a "negative condition".

In the above-described negative condition, the measurement result of the capacitance change of the variable capacitor 2 in the case where the control voltage (the first control voltage signal DC1 and the second control voltage signal DC2) having a duty rate of 50% is continuously applied to the variable capacitor 2 for 4 hours is shown in Table 3 below.

TABLE 3

| Positive condition | At start-up | After 4 hours | Δ | Δ/Cratio |
|---|---|---|---|---|
| 0 V | 1.000 | 0.979 | 0.021 | |
| 3 V | 0.612 | 0.618 | −0.006 | |
| Cratio | 0.612 | 0.632 | −0.020 | −0.03213 |

The term "Cratio" in Tables 2 and 3 denotes a capacitance ratio (C1/C0) of the capacitance value C0 in the case of the control voltage of 0 V (during standby state) to the capacitance value C1 in the case of the control voltage of 3 V (during communication). Further, the capacitance value of the variable capacitor 2 shown in Tables 2 and 3 is at the beginning of the control voltage application, and is a relative value in the case where it is assumed that the capacitance in the case of the control voltage of 0 V (during standby state) is "1".

Further, the term "Δ" in Tables 2 and 3 denotes variation of the capacitance in the case where the control voltage is applied for 4 hours and variation of the capacitance ratio Cratio (value at the start-up−value after 4 hours). Further, the term "Δ/Cratio" in Tables 2 and 3 denotes a value that is obtained by normalizing the variation (Δ) of the capacitance ratio Cratio with the capacitance ratio Cratio.

Further, the variation (Δ) of the capacitance ratio Cratio and "Δ/Cratio" are all parameters that indicate time-dependent variation of the variable width of the capacitance of the variable capacitor 2. Specifically, if the variation (Δ) of the capacitance ratio Cratio and "Δ/Cratio" have plus values, it means that the variable width of the capacitance of the variable capacitor 2 is widened after the control voltage is applied for 4 hours. On the other hand, if the variation (Δ) of the capacitance ratio Cratio and "Δ/Cratio" have minus values, it means that the variable width of the capacitance of the variable capacitor 2 is narrowed after the control voltage is applied for 4 hours. For example, in an example of Table 3, the variable width of the capacitance of the variable capacitor 2 is narrowed by about 2% after the control voltage is applied for 4 hours in comparison to the variable width at the start-up of the control voltage application (variation Δ of the capacitance ratio Cratio=−0.020).

As is apparent from Tables 2 and 3, the capacitance in the case of the control voltage of 0 V (during standby state) after the control voltage having a duty rate of 50% was applied to the variable capacitor 2 for 4 hours was reduced by 3.0% in the positive condition, and was reduced by 2.1% in the negative condition. On the other hand, the capacitance in the case of the control voltage of 3 V (during standby state) after the control voltage having a duty rate of 50% was applied to the variable capacitor 2 for 4 hours was increased by 1.5% in the positive condition, and was increased by 0.6% in the negative condition. The result of the capacitance change in the case of the control voltage of 3 V (during communication) was opposite to the result (characteristic 7 in FIG. 2) in the case of continuously applying the control voltage of about 3 V in the verification test 1. This difference is considered to be caused by the influence of the hysteresis characteristic (voltage history characteristic) of the variable capacitor 2.

Further, the variation (Δ) of the capacitance ratio Cratio became −3.5% in the positive condition, and became −2.0% in the negative condition. That is, in the method of applying the control voltage in the verification test 2, in the case of applying the control voltage having a duty rate of 50% was applied for 4 hours, the variable width of the capacitance of the variable capacitor 2 was narrowed by about 3.5% in the positive condition, and was also narrowed by about 2% in the negative condition.

In the case of continuously applying the control voltage having a duty rate of 50% that is generated by the first control voltage signal DC1 and the second control voltage signal DC2 illustrated in FIG. 3, it was found that the variable width of the capacitance of the variable capacitor 2 was narrowed from the measurement result of the verification test 2.

[Principle of Suppressing the Influence of the Hysteresis Characteristic and the Aging Characteristic]

In the present disclosure, in order to suppress the influence of the hysteresis characteristic and the aging characteristic of the variable capacitor 2 using the ferroelectric material, the control voltage is applied to the variable capacitor 2 in the following method.

(1) Method of Applying the Control Voltage

Figure 6:
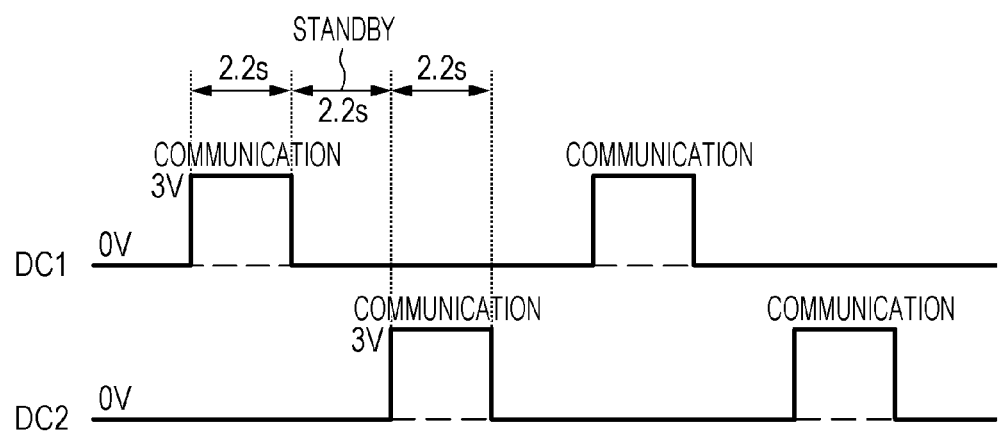
FIG. 6 is a diagram illustrating an example of a method of applying a control voltage to a variable capacitor according to an embodiment of the present disclosure.
Figure 7:
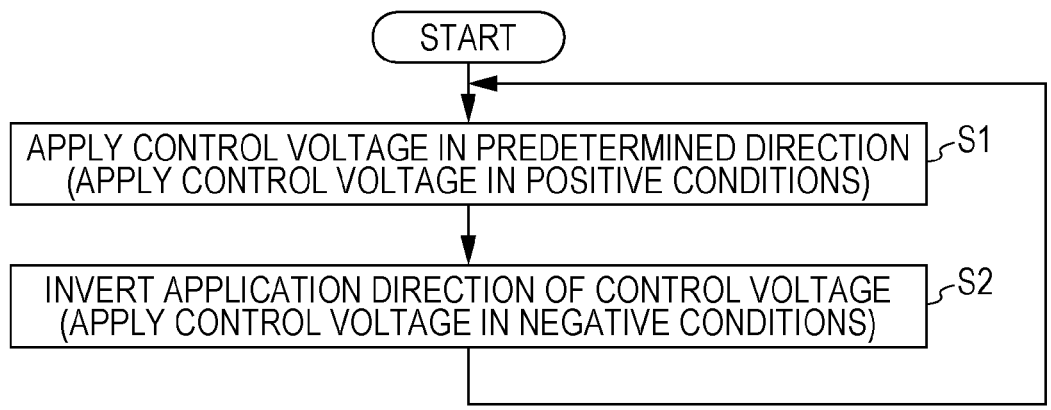
FIG. 7 is a flowchart illustrating a procedure of applying a control voltage to a variable capacitor according to an embodiment of the present disclosure.

In FIGS. 6 and 7, examples of the method of applying the control voltage to the variable capacitor 2 according to an embodiment of the present disclosure are shown. FIG. 6 is a diagram illustrating an example of signal waveforms of the first control voltage signal DC1 applied to the first control terminal 2a of the variable capacitor 2 and the second control voltage signal DC2 applied to the second control terminal 2b. Further, FIG. 7 is a flowchart illustrating a procedure of applying the control voltage to the variable capacitor 2 according to an embodiment of the present disclosure.

In an example illustrated in FIG. 6, it is assumed that both the first control voltage signal DC1 and the second control voltage signal DC2 are pulse signals having an amplitude of 3 V, a pulse width of 2.2 sec, and the pulse period of 8.8 sec. Further, in an example illustrated in FIG. 6, the DC pulse voltages of the first control voltage signal DC1 and the second control voltage signal DC2 are alternately applied to the variable capacitor 2 in a period of 4.4 sec.

That is, in an example of the method of applying the control voltage illustrated in FIG. 6, first, the DC pulse voltage having the amplitude of 3 V in the first control voltage signal DC1 is applied (the DC pulse voltage having the amplitude of 3 V is applied from the first control terminal 2a of the variable capacitor 2 to the direction toward the second control terminal 2b). That is, the control voltage is applied to the variable capacitor 2 in the positive condition (step S1).

Next, the DC pulse voltage having the amplitude of 3 V in the second control voltage signal DC2 is applied (the DC pulse voltage having the amplitude of 3 V is applied from the second control terminal 2b of the variable capacitor 2 to the direction toward the first control terminal 2a). That is, the application direction of the control voltage is inverted, and the control voltage is applied to the variable capacitor 2 in the negative condition (step S2). In an example illustrated in FIG. 6, the application operation of the control voltage in the positive condition and the application operation of the control voltage in the negative condition are alternately performed in the period of 4.4 sec.

The application operation and the inversion operation of the control voltage are controlled by a voltage generation circuit that generates the first control voltage signal DC1 and the second control voltage signal DC2, to be described hereinafter (see FIG. 10 to be described hereinafter). Further, hereinafter, the method of applying the control voltage that inverts the application operation of the control voltage in the positive condition and the application operation of the control voltage in the negative condition at a predetermined rate is called a polarity inversion drive method.

Here, for simplification of the explanation and for consistency with the measurement condition of the verification test 2, it is exemplified that the operation of applying the control voltage of 3 V (communications operation) is performed in the period of 4.4 sec. However, commonly, the non-contact communications operation is not periodically performed in the communications device, and in the actual communications device, the timing of inverting the application operation of the control voltage in the positive condition and the application operation of the control voltage in the negative condition becomes optional.

In FIG. 6, for consistency with the measurement condition of the verification test 2, the pulse width of the respective control voltage signals is set to 2.2 sec. However, the present disclosure is not limited thereto. The pulse width of the respective control voltage signals, for example, is appropriately set according to the use (kind of a communications device to which the method of applying the control voltage according to the present disclosure is applied).

Further, in an open loop type communications device in which a predetermined control voltage is continuously applied to the variable capacitor 2 to set the resonant frequency to a predetermined frequency, as illustrated in FIG. 6, the amplitude of the pulse signal constantly becomes 3 V. However, in a closed type communications device in which the control voltage is controlled to obtain the optimum resonant frequency while the communications characteristic is detected, the amplitude of the DC pulse voltage is appropriately changed.

(2) Verification Test 3

In the verification test 3, in the measurement system 1 illustrated in FIG. 1, by a polarity inversion drive type control voltage application method according to this embodiment illustrated in FIG. 6, the control voltage was continuously applied to the variable capacitor 2 for 8 hours. Then, in the verification test 3, in the same manner as the verification test 2, when the application of the control voltage started and when 8 hours elapsed after the application, the capacitance of the variable capacitor 2 was measured in the case of the control voltage of 3 V (during communication) and in the case of the control voltage of 0 V (during standby state), respectively. Further, in the verification test 3, the control voltage was applied to the variable capacitor 2 for 8 hours, and this was to match the respective application times (4 hours) of the control voltage in the positive condition in the verification test 3 and in the negative condition with the measurement condition of the verification test 2.

The result of the verification test 3 is shown in Tables 4 and 5 below. Table 4 shows the measurement result of the capacitance change of the variable capacitor 2 in the positive condition, and Table 5 shows the measurement result of the capacitance change of the variable capacitor 2 in the negative condition. Further, the capacitance value of the variable capacitor 2 shown in Tables 4 and 5 is at the start-up of the control voltage application in the positive condition, and is a relative value if it is assumed that the capacitance in the case of the control voltage of 0 V (during standby state) is "1".

TABLE 4

| Positive Condition | At start-up | After 8 hours | Δ | Δ/Cratio |
|---|---|---|---|---|
| 0 V | 1.000 | 1.011 | −0.011 | |
| 3 V | 0.632 | 0.627 | 0.005 | |
| Cratio | 0.632 | 0.620 | 0.011 | 0.017777 |

TABLE 5

| Positive condition | At start-up | After 4 hours | Δ | Δ/Cratio |
|---|---|---|---|---|
| 0 V | 1.010 | 1.015 | −0.005 | |
| 3 V | 0.603 | 0.610 | −0.007 | |
| Cratio | 0.597 | 0.600 | −0.004 | −0.00604 |

As is apparent from Tables 4 and 5, in the case of applying the control voltage in the polarity inversion drive method illustrated in FIG. 6, the capacitance in the case of the control voltage of 0 V (during standby state) after 8 hours was increased by 1.1% in the positive condition, and was increased by 0.5% in the negative condition. That is, the measurement result of the time-dependent change of the capacitance in the case of the control voltage of 0 V obtained in the verification test 3 was opposite to the measurement result of the verification test 2 (the control voltage application method only in the positive condition or in the negative condition).

On the other hand, the capacitance in the case of the control voltage of 3 V (during communication) after 8 hours was reduced by 0.5% in the positive condition, and was increased by 0.7% in the negative condition. As a result, the variation (Δ) of the capacitance ratio Cratio became +1.1& in the positive condition, and became −0.4% in the negative condition.

As is apparent from the result of the verification test 3, in the case of applying the control voltage in the polarity inversion drive method, the absolute values of the capacitance variation in the case of the control voltages of 0 V and 3 V and the absolute values of the variation of the capacitance ratio Cratio became smaller than the results in the verification test 2 in all. That is, by driving the variable capacitor 2 in the polarity inversion drive method switching the positive condition and the negative condition at a predetermined rate, it was found that the capacitance of the variable capacitor 2 and the time-dependent change of the variable width could become smaller.

Here, in order to compare the application methods of the control voltage according to the embodiment, even in the case where the control voltage was applied to the variable capacitor 2 for 8 hours only in the positive condition, in the same manner as the verification test 3, the capacitance change of the variable capacitor 2 was investigated. The result of the investigation is shown in Table 6 below.

TABLE 6

| Positive condition | At start-up | After 4 hours | Δ | Δ/Cratio |
|---|---|---|---|---|
| 0 V | 1.000 | 0.970 | 0.030 | |
| 3 V | 0.629 | 0.648 | −0.019 | |
| Cratio | 0.629 | 0.667 | −0.039 | −0.06173 |

Even in this case, as is apparent from Table 6, the same result as the measurement result of the verification test 2 (Table 2) can be obtained. That is, even in the case of applying the control voltage for 8 hours only in the positive condition, the absolute values of the capacitance variation in the case of the control voltages of 0 V and 3 V and the absolute values of the variation of the capacitance ratio Cratio became larger than those in the case of applying the control voltage in the polarity inversion drive method in all.

As described above, in the polarity inversion drive type control voltage application method according to this embodiment, the time-dependent change of the capacitance of the variable capacitor 2 can be reduced in comparison to the method of applying the control voltage in the positive condition or in the negative condition. Further, in the polarity inversion drive type control voltage application method according to this embodiment, the time-dependent change of the capacitance ratio Cratio of the variable capacitor 2, that is, the time-dependent change of the variable width of the capacitance can be reduced.

(3) Time-Dependent Change of the Variation of Capacitance of a Variable Capacitor Here, the change characteristic (time-dependent change) of the variable width (variation (A) of the capacitance ratio Cratio) of the capacitance of the variable capacitor 2 in the polarity inversion drive type control voltage application method according to this embodiment will be described in more detail.

In the case of continuously applying the control voltage only in the positive condition as in the verification test 2, as shown in Table 2, after the control voltage is applied for 4 hours, the variable width (variation of the capacitance ratio Cratio) of the capacitance of the variable capacitor 2 becomes narrowed by about 3.5% with respect to the variable width at the start-up of the control voltage application. By contrast, in the method of applying the control voltage according to this embodiment, as shown in Table 4, after the control voltage is applied for 8 hours, the variable width of the capacitance of the variable capacitor 2 in the positive condition is widened by about 1.1% with respect to the variable width at the start-up of the control voltage application.

That is, in this embodiment, by the method in the verification test 2, the time-dependent change of the variable width of the capacitance of the variable capacitor 2 in the positive condition can be reduced, and the variable width of the capacitance can be extended. The difference in time-dependent change between the variable widths of the capacitance of both parties is shown in FIGS. 8 and 9.

Figure 8:
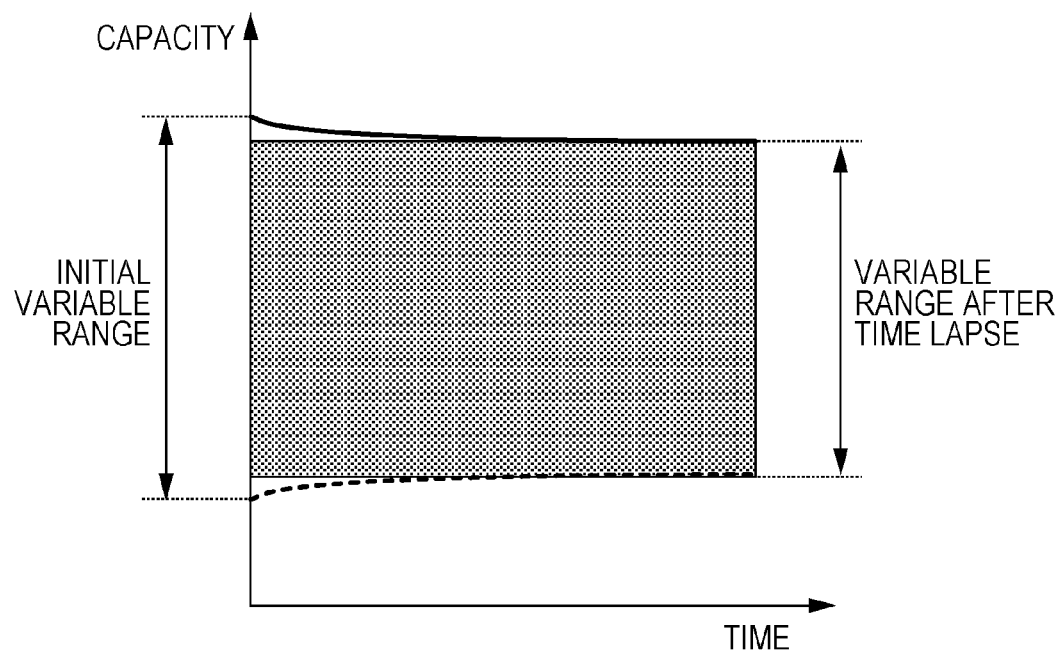
FIG. 8 is a schematic diagram illustrating a time-dependent change of the variation of capacitance in a positive condition of verification test 2.

As in the verification test 2, FIG. 8 is a diagram schematically illustrating the time-dependent change of the capacitance in the case of the control voltage of 0 V (during standby state) and the capacitance in the case of the control voltage of 3 V (during communication) in the case where the control voltage is applied to the variable capacitor 2 only in the positive condition. Further, FIG. 9 is a diagram schematically illustrating the time-dependent change of the capacitance in the case of the control voltage of 0 V (during standby state) and the capacitance in the case of the control voltage of 3 V (during communication) in the positive condition in the case where the control voltage is applied to the variable capacitor 2 in the polarity inversion drive method according to this embodiment. Further, the characteristic shown by thick solid lines in FIGS. 8 and 9 is the time-dependent change characteristic of the capacitance in the case of the control voltage of 0 V, and the characteristic shown by thick dashed lines is the time-dependent change characteristic of the capacitance in the case of the control voltage of 3 V.

In the case of applying the control voltage to the variable capacitor 2 only in the positive condition, as shown in FIG. 8, with the lapse of time, the capacitance in the case of the control voltage of 0 V (during standby state) is reduced, and the capacitance in the case of the control voltage of 3 V (during communication) is increased. As a result, in this case, the variable width of the capacitance is narrowed with the lapse of time.

Figure 9:
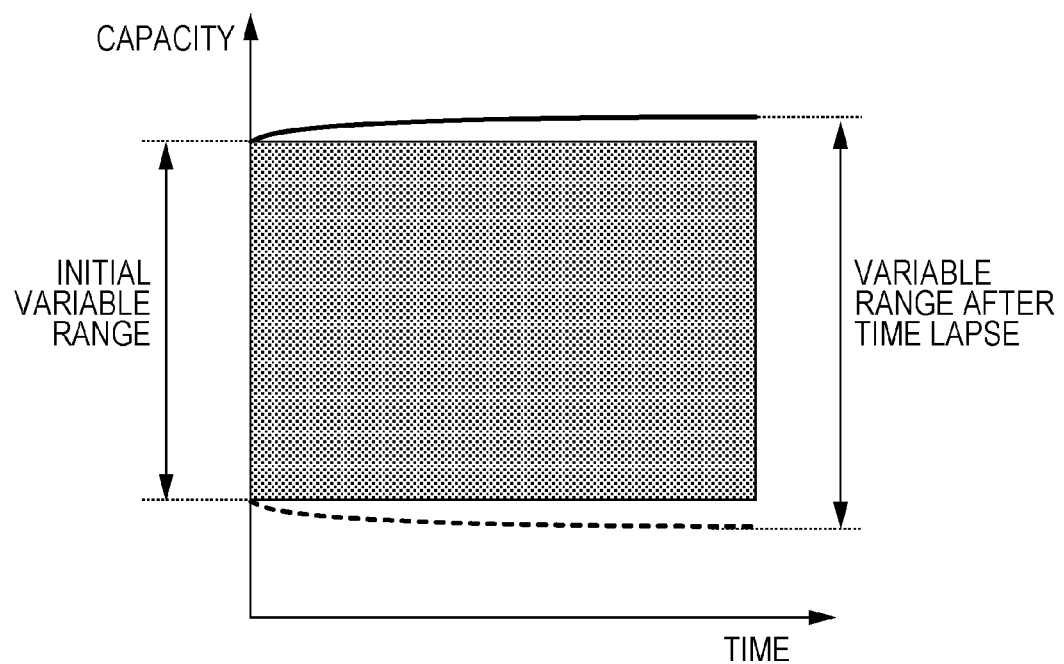
FIG. 9 is a schematic diagram illustrating a time-dependent change of the variation of capacitance in a positive condition in a method of applying a control voltage according to an embodiment of the present disclosure.

By contrast, in the polarity inversion drive method according to this embodiment, as shown in FIG. 9, with the lapse of time, the capacitance in the case of the control voltage of 0 V is increased, and the capacitance in the case of the control voltage of 3 V is reduced. As a result, in this case, the variable width of the capacitance is widened with the lapse of time.

Further, in the method of applying the control voltage according to this embodiment, as shown in Table 5, after the control voltage is applied for 8 hours, the variable width (variation (A) of the capacitance ratio Cratio) of the capacitance of the variable capacitor 2 becomes narrowed by about 0.4% with respect to the variable width at the start-up of the control voltage application. By contrast, in the case of continuously applying the control voltage only in the negative condition as in the verification test 2, as shown in Table 3, after the control voltage is applied for 4 hours, the variable width of the capacitance of the variable capacitor 2 is narrowed by about 2.0% with respect to the variable width at the start-up of the control voltage application.

That is, in the negative condition, even in the polarity inversion drive method according to this embodiment, in the same manner as the case of the verification test 2, the variable width of the capacitance of the variable capacitor 2 is narrowed with the lapse of time. However, in this embodiment, in comparison to the method in the verification test 2, the time-dependent change of the variable width of the capacitance of the variable capacitor 2 in the negative condition can be reduced.

As described above, in the polarity inversion drive type control voltage application method according to this embodiment, despite doubling the application time of the control voltage in comparison to the verification test 2, the time-dependent change of the capacitance of the variable capacitor 2 and the time-dependent change of the variable width of the capacitance can be reduced. Further, according to circumstances, the variable width of the capacitance of the variable capacitor 2 can be extended. That is, in the polarity inversion drive type control voltage application method according to this embodiment, the capacitance and the variable width of the variable capacitor 2 can be stably controlled for an extended period of time.

It is considered that this is because the influences of the hysteresis characteristic and the aging characteristic of the variable capacitor 2 occurring in the positive condition and in the negative condition are exerted to cancel each other when the control voltage is applied in the polarity inversion drive method. Accordingly, in order to cancel the influences of the hysteresis characteristic or the aging characteristic more reliably, it is preferable that the application condition of the control voltage (voltage value and the pulse width) in the positive condition be equivalent to the application condition of the control voltage in the negative condition.

<2. Configuration Example of a Communications Device and a Resonant Circuit>

Next, configuration example 1 of the communications device and the resonant circuit to which the polarity inversion drive type control voltage application method according to this embodiment is applied will be described.

[Configuration of a Communications Device]

Figure 10:
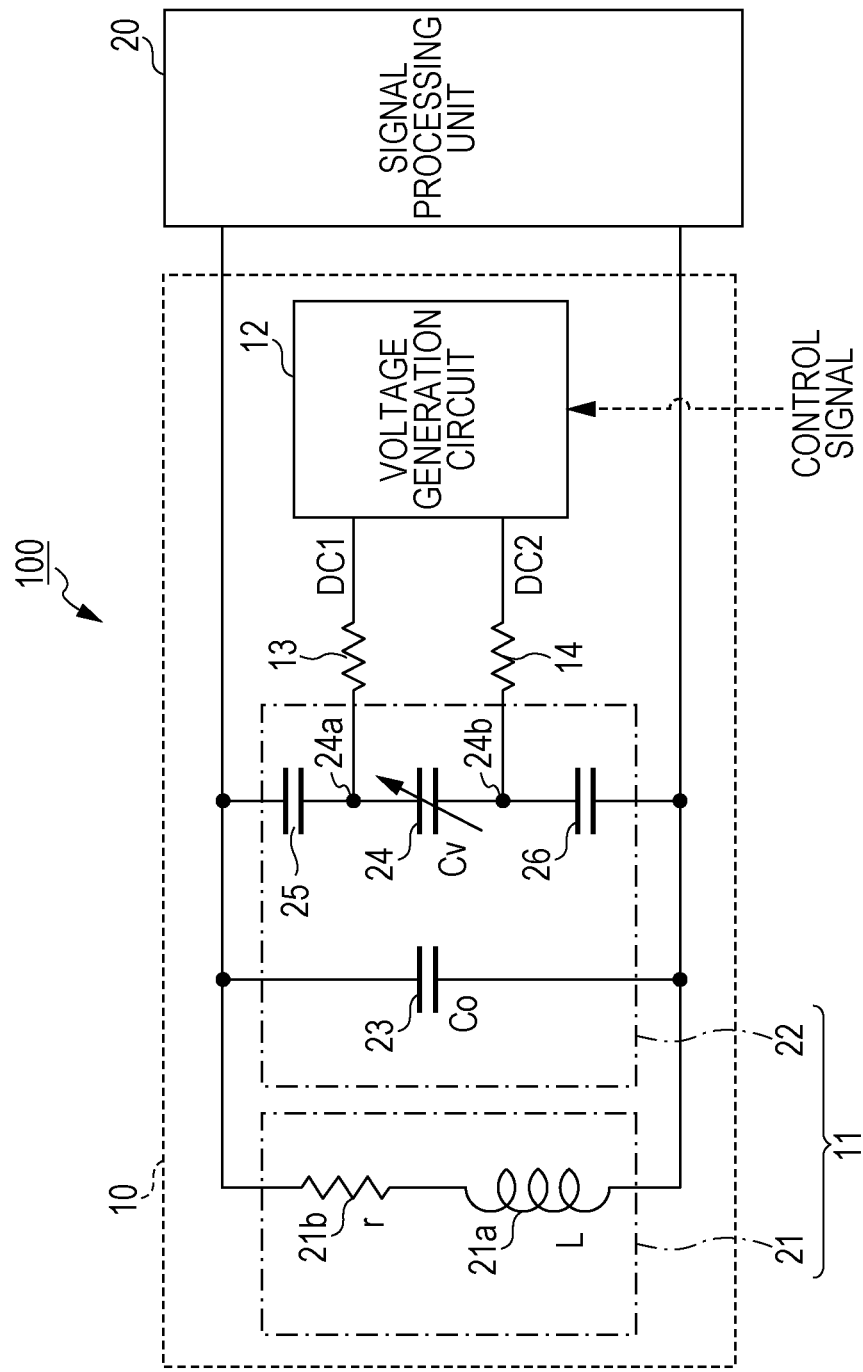
FIG. 10 is a schematic circuit configuration diagram of a communications device and a resonant circuit according to an embodiment of the present disclosure.

FIG. 10 illustrates a schematic circuit configuration of the communications device and the resonant circuit according to an embodiment of the present disclosure. Further, FIG. 10 illustrates a schematic circuit configuration of the communications device such as an information processing terminal or the like, for example, having a non-contact communications function. In FIG. 10, to simplify the explanation, only the configuration of a reception system (demodulation system) circuit unit of the communications device is illustrated. Other configuration including a signal transmission system (modulation system) circuit unit may be configured in the same manner as the communications device in the related art.

A communications device 100 has a reception unit 10 (resonant circuit) and a signal processing unit 20. Further, although not illustrated in FIG. 10, the communications device 100 has a control unit including a circuit, for example, such as a CPU (Central Processing Unit) for controlling the whole operation of the communications device 100. Further, the signal processing unit 20 performs a predetermined process with respect to an AC signal received through the reception unit 10 and demodulates the AC signal.

The reception unit 10 includes a resonant antenna 11, a voltage generation circuit 12 (control voltage generation unit), and two resistors 13 and 14. Further, the reception unit 10 receives a signal transmitted from an external R/W (not illustrated) through the resonant antenna 11, and outputs the received signal to the signal processing unit 20.

In the reception unit 10, one output terminal of the voltage generation circuit 12 is connected to one terminal (first control terminal 24a) of a variable capacitor 24 to be described hereinafter through the resistor 13. Further, a first control voltage signal DC1 generated from the voltage generation circuit 12 is input to the first control terminal 24a of the variable capacitor 24. Further, the other output terminal of the voltage generation circuit 12 is connected to the other terminal (second control terminal 24b) of the variable capacitor 24 to be described hereinafter through the resistor 14. Further, a second control voltage signal DC2 generated from the voltage generation circuit 12 is input to the second control terminal 24b of the variable capacitor 24.

The resonant antenna 11 includes a resonant coil 21 and a resonant capacitor 22. Further, in FIG. 10, the resonant coil 21 is separately illustrated as an inductance component 21a(L) and a resistor component 21b(r: several ohms).

The resonant capacitor 22 includes a fixed capacitor 23 having capacitance Co, a variable capacitance 24 (variable capacitance element), and two bias-removing capacitors 25 and 26 connected both terminals of the variable capacitor 24. Further, a serial circuit, which is composed of the fixed capacitor 23, the variable capacitor 24, and the two bias-removing capacitors 25 and 26, is connected in parallel to the resonant coil 21.

The fixed capacitor 23 has a dielectric layer (not illustrated) made of a dielectric material (dielectric constant material) with low dielectric constant. The capacitance of the fixed capacitor 23 is little changed regardless of the kind and the signal level of an input signal.

The variable capacitor 24 has a dielectric layer (not illustrated in FIG. 10) formed of a ferroelectric material with high dielectric constant. In this embodiment, the capacitance C V of the variable capacitor 24 is changed according to the first control voltage signal DC1 and the second control voltage signal DC2 input from the voltage generation circuit 12 through the two resistors 13 and 14.

Figure 11:
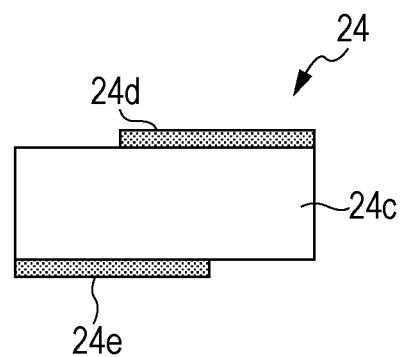
FIG. 11 is a schematic configuration diagram of a variable capacitor.

Further, as the variable capacitor 24, a two-terminal type variable capacitor having a connection terminal that is connected to the bias-removing capacitor and a common control voltage input terminal may be used. Here, FIG. 11 shows a schematic configuration of the two-terminal type variable capacitor 24. In order to simplify the explanation, the variable capacitor 24 having one dielectric layer is described as an example. The two-terminal type variable capacitor 24 includes an upper electrode 24d and a lower electrode 24e, which are formed to sandwich the dielectric layer 24c (dielectric unit) that is formed of the ferroelectric material. By the upper electrode 24d and the lower electrode 24e, the first control terminal 24a and the second control terminal 24b are configured.

Further, as the variable capacitor 24, a four-terminal type variable capacitor having connection terminals that are connected to the bias-removing capacitor and input terminals of the control voltage signal separately provided.

Further, the two bias-removing capacitors 25 and 26 and the two resistors 13 and 14 are installed to suppress the influence caused by interference between a DC bias current (control current) that flows between the voltage generation circuit 12 and the variable capacitor 24 and the received signal current.

The voltage generation circuit 12 generates the first control voltage signal DC1 and the second control voltage signal DC2 that are applied to the variable capacitor 24. Further, the voltage generation circuit 12 outputs the first control voltage signal DC1 and the second control voltage signal DC2 to the variable capacitor 24 according to the above-described polarity inversion drive type application method.

Specifically, for example, the voltage generation circuit 12 generates and outputs the first control voltage signal DC1 and the second control voltage signal DC2, which are pulses as described above with reference to FIG. 6, to the variable capacitor 24. In this case, the voltage generation circuit 12 outputs the first control voltage signal DC1 and the second control voltage signal DC2 according to the above-described polarity inversion drive method. For example, in a predetermined communications period, the voltage generation circuit 12 applies the first control voltage signal DC1 and the second control voltage signal DC2 in the positive condition, and in the next communications period, applies the first control voltage signal DC1 and the second control voltage signal DC2 in the negative condition. Further, the application operation of the control voltage of the voltage generation circuit 12 is controlled by a control unit (CPU) that is not illustrated in FIG. 10.

Further, the first control voltage signal DC1 and the second control voltage signal DC2, which are pulse signals as described above with reference to FIG. 6, for example, may be generated by installing a voltage source including a D/A (Digital to Analog) converter for each control voltage signal in the voltage generation circuit 12. In this case, the application direction of the control voltage in the thickness direction of the dielectric layer 24*c* of the variable capacitor 24 may be inverted without using a voltage source having a minus voltage. Further, the driving power of the D/A converter may be installed outside or inside of the voltage generation circuit 12.

In the communications device 100 according to this embodiment, as described above, the capacitance of the variable capacitor 24 in the reception unit 10 is controlled, for example, according to the polarity inversion drive type control voltage application method as described above with reference to FIG. 6. Accordingly, in the communications device 100 according to this embodiment, the resonant frequency of the reception unit 10 that includes the variable capacitor 24 can be controlled more stably for an extended period of time, and through this, the long-term stability of the non-contact communications operation of the communications device can be improved.

Further, in the communications device of the type that continuously applies the predetermined control voltage to the variable capacitor in order to set the resonant frequency to a predetermined frequency, it is preferable that both the capacitance changes during the standby state (0 V) and during the communications (3 V) be small. Through this, in a closed type communications device that controls the control voltage so as to obtain the optimum resonant frequency as detecting the communications characteristic, it is preferable to avoid a narrow variable width of the capacitance. As described above, in the polarity inversion drive type control voltage application method according to this embodiment, the time-dependent change of the capacitance of the variable capacitor 2 can be reduced and the time-dependent change of the variable width of the capacitance can be reduced. Accordingly, the method of applying the control voltage according to this embodiment is quite suitable to any one of an open loop type communications device and a closed type communications device.

<3. Various Kinds of Modified Examples>

MODIFIED EXAMPLE 1

As described above in the embodiment, the first control voltage signal DC1 and the second control voltage signal DC2, which are pulse signals as illustrated in FIG. 6, for example, can be generated by installing a voltage source for each control voltage signal in the voltage generation circuit 12. However, the configuration of the voltage generation circuit 12 is not limited thereto, and the voltage generation circuit 12 can be optionally configured so far as the voltage generation circuit 12 is configured to separately generate the first control voltage signal DC1 and the second control voltage signal DC2, which are pulse signals as illustrated in FIG. 6. For example, the voltage generation circuit 12 may be configured to generate the first control voltage signal DC1 and the second control voltage signal DC2 as one voltage source. In the modification example 1, its configuration example 1 will be described.

Figure 12:
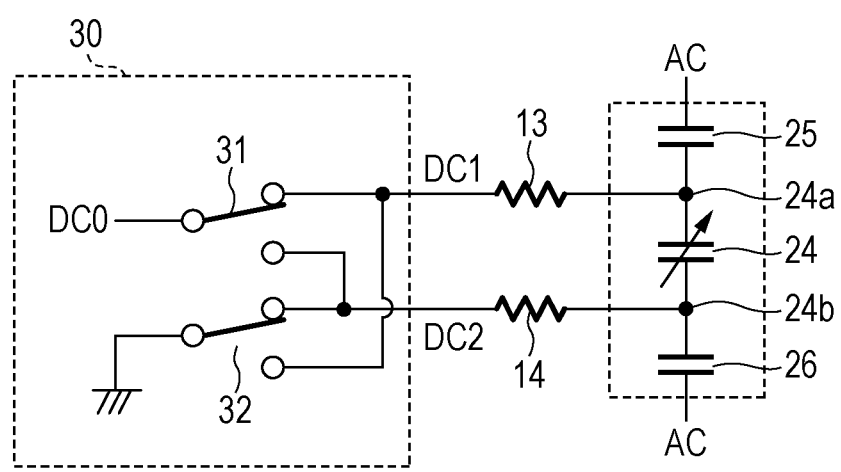
FIG. 12 is a schematic configuration diagram of the vicinity of a voltage generation circuit in a communications device according to modified example 1.

FIG. 12 illustrates a schematic configuration of the vicinity of the voltage generation circuit 30 and the variable capacitor 24 in the communications device according to modified example 1. Further, even in the communications device according to the example illustrated in FIG. 12, the same reference numerals are used for the same configuration as the configuration of the communications device 100 according to the above-described embodiment illustrated in FIG. 10. Further, in the example of the communications device, the same configuration as the above-described embodiment can be used except that the configuration of the voltage generation circuit 30 is different from the configuration according to the above-described embodiment. Accordingly, here, only the configuration of the voltage generation circuit 30 will be described.

In this example, the voltage generation circuit 30 includes a first selection switch 31, a second selection switch 32, and one voltage source (including D/A converter) that is not shown in FIG. 12.

An input terminal of the first selection switch 31 is connected to an output terminal of the voltage source, and a pulse signal DC0 that is output from the voltage source is applied to the first selection switch 31. Further, one output terminal of the first selection switch 31 is connected to the first control terminal 24*a* of the variable capacitor 24 through the resistor 13, and the other output terminal of the first selection switch 31 is connected to the second control terminal 24*b* of the variable capacitor 24 through the resistor 14.

On the other hand, the input terminal of the second selection switch 32 is grounded. Further, one output terminal of the second selection switch 32 is connected to the second control terminal 24*b* of the variable capacitor 24 through the resistor 14, and the other output terminal of the second selection switch 32 is connected to the first control terminal 24*a* of the variable capacitor 24 through the resistor 13.

In the voltage generation circuit 30 in this example, first, the first control terminal 24*a* of the variable capacitor 24 is selected by the first selection switch 31, and the second control terminal 24*b* of the variable capacitor 24 is selected by the second selection switch 32 (the state in FIG. 12). In this selected state, the pulse signal DC0 output from the voltage source is applied to the first control terminal 24*a*, and second control terminal 24*b* is grounded. In this case, the application operation of the control voltage in the positive condition is realized.

Next, after a predetermined time, the voltage generation circuit 30 selects the second control terminal 24b of the variable capacitor 24 through the first selection switch 31, and selects the first control terminal 24a of the variable capacitor 24 through the second selection switch 32. In this selection state, the pulse signal DC0 output from the voltage source is applied to the second control terminal 24b, and the first control terminal 24a is grounded. In this case, the application operation of the control voltage in the negative condition is realized.

In this example, the voltage generation circuit 30 operates as described above, and changes the application operation of the control voltage in the positive condition and the application operation of the control voltage in the negative condition through changing the selection state of the first selection switch 31 and the second selection switch 32.

More specifically, for example, the voltage generation circuit 30 generates a DC pulse signal DC0 having an amplitude of 3 V and a pulse width of 2.2 sec through the voltage source. Further, by performing the selection operation of the first selection switch 31 and the second selection switch 32 in the period of 4.4 sec, the first control voltage signal DC1 and the second control voltage signal DC2 as illustrated in FIG. 6 can be generated. Accordingly, in this example, since the voltage generation circuit 30 is used in the same manner as the above-described embodiment, and the capacitance of the variable capacitor 24 can be controlled, the same effect as that according to the above-described embodiment can be obtained.

Further, in the voltage generation circuit 30 according to this example, since it is enough to provide only one voltage source that includes the D/A converter, the voltage generation circuit 30 (communications device) can be configured at low cost and with simple and easy configuration.

MODIFIED EXAMPLE 2

In an example illustrated in FIG. 6, the timing in which the DC pulse voltage of 3 V is applied may differ, but the signal waveforms of the first control voltage signal DC1 and the second control voltage signal DC2 are the same. However, the present disclosure is not limited thereto. An optional control voltage signal may be used so far as the application operation of the control voltage in the positive condition and the application operation of the control voltage in the negative condition are switched (alternately performed) through changing the first control voltages signal DC1 and the second control voltage signal DC2.

In the modified example 2, the first control voltage signal DC1 and the second control voltage signal DC2 having different signal waveforms from the above-described embodiment are used, and the polarity inversion drive type control voltage application method is realized.

Figure 13:
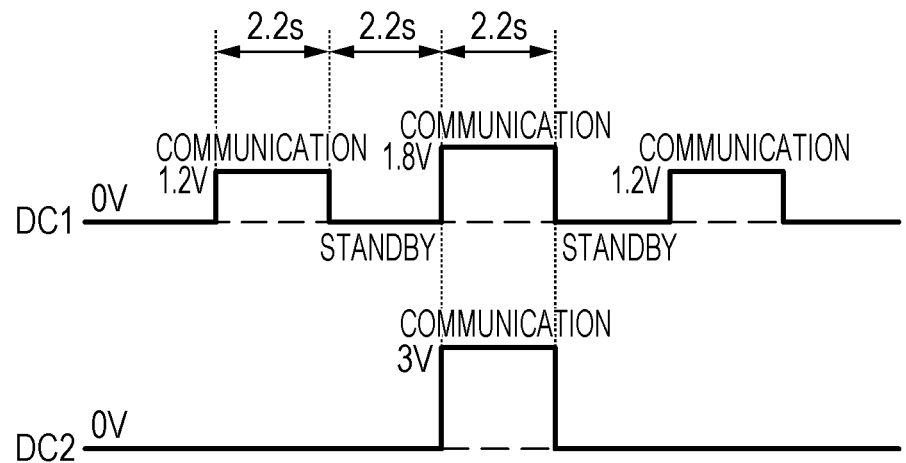
FIG. 13 is a diagram illustrating an example of signal waveforms of a first control voltage signal and a second control voltage signal used in the control voltage applying method according to modified example 2.

(1) Configuration of the First Control Voltage Signal and the Second Control Voltage Signal FIG. 13 shows an example of signal waveforms of the first control voltage signal DC1 and the second control voltage signal DC2. In this example, as the first control voltage signal DC1, a pulse signal that alternately generates a DC pulse voltage having the amplitude of 1.2 V and the pulse width of 2.2 sec and a DC pulse voltage having the amplitude of 1.8 V and the pulse width of 2.2 sec in the period of 4.4 sec. Further, in this example, as the second control voltage signal DC2, a pulse signal that is in synchronization with the generation timing of the DC pulse voltage of the first control voltage signal DC1 with the amplitude of 1.8 V and the pulse width of 2.2 sec, and generates a DC pulse voltage with the amplitude of 1.8 V and the pulse width of 2.2 sec and a DC pulse voltage having the amplitude of 3.0 V and the pulse width of 2.2 sec.

In the case of using the first control voltage signal DC1 and the second control voltage signal DC2 having the pulse configuration illustrated in FIG. 13, the second control voltage signal DC2 becomes 0 V in a period in which a DC pulse voltage having the amplitude of 1.2 V and the pulse width of 2.2 sec of the first control voltage signal DC1 is generated. In this case, the application direction of the control voltage in the thickness direction of the dielectric layer 24c of the variable capacitor 24 becomes the direction that is directed from the first control terminal 24a to the second control terminal 24b, and the control voltage is applied in the above-described polarity condition.

On the other hand, the second control voltage signal DC2 becomes 3 V in a period in which a DC pulse voltage having the amplitude of 1.8 V and the pulse width of 2.2 sec of the first control voltage signal DC1 is generated. In this case, the potential of the second control terminal 24b of the variable capacitor 24 is higher than the potential of the first control terminal 24a by 1.2 V. Accordingly, in this case, the application direction of the control voltage in the thickness direction of the dielectric layer 24c of the variable capacitor 24 becomes the direction that is directed from the second control terminal 24b to the first control terminal 24a, and becomes equivalent to the application state of the control voltage in the above-described negative condition.

In an example illustrated in FIG. 13, the application operation of the control voltage is equivalent to alternate application operation of the DC pulse voltage having the amplitude of 1.2 V and the pulse width of 2.2 sec to the first control terminal 24a and the second control terminal 24b of the variable capacitor 24 in the period of 4.4 sec. Accordingly even in this example, in the same manner as the above-described embodiment, the application operation of the control voltage in the positive condition and the application operation of the control voltage in the negative condition can be switched.

Further, in an example of FIG. 13, in order to simplify the explanation, the operation (communications operation) of applying the control voltage in the same manner as the above described embodiment (FIG. 6) is performed in the period of 4.4 sec will be described. However, commonly, the non-contact communications operation is not periodically performed in the communications device, and in the actual communications device, the timing of inverting the application operation of the control voltage in the above-described positive condition and the application operation of the control voltage in the negative condition becomes optional. Further, in an example of FIG. 13, in the same manner as the above-described embodiment (FIG. 6), the pulse width of the DC pulse voltage is set to 2.2 sec. However, the present disclosure is not limited thereto. The pulse width of the DC pulse voltage, for example, is appropriately set according to the use or the like.

(2) Configuration of the Voltage Generation Circuit

Figure 14:
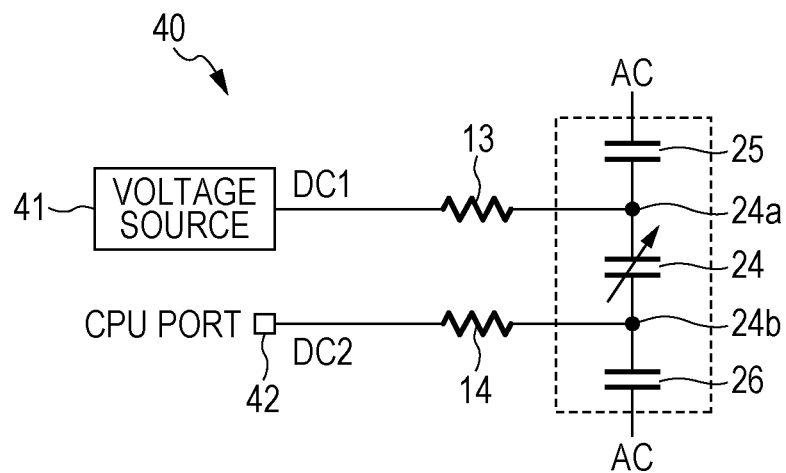
FIG. 14 is a schematic configuration diagram of the vicinity of a voltage generation circuit in a communications device according to modified example 2.

Next, the configuration example of the voltage generation circuit for realizing the polarity inversion drive type control voltage application method as illustrated in FIG. 13 will be described. FIG. 14 shows a schematic circuit configuration of the vicinity of the voltage generation circuit in the communications device according to this example. Further, in the communications device in this example as illustrated in FIG. 14, the same reference numerals are used for the same configuration as the communications device 100 according to the above-described embodiment as illustrated in FIG. 10. Further, in the example of the communications device, the same configuration as the above-described embodiment can be used except that the configuration of the voltage generation circuit 40 is different from the configuration according to the above-described embodiment. Accordingly, here, only the configuration of the voltage generation circuit 40 will be described.

In this example, the voltage generation circuit 40 includes a voltage source 41 and an input/output port 42.

The voltage source 41 includes a D/A converter, and generates the first control voltage signal DC1 having the signal waveform illustrated in FIG. 13, and outputs the first control voltage signal DC1 to the first control terminal 24a of the variable capacitor 24 through the resistor 13.

The input/output port 42 is connected to a CPU port of the control unit (not illustrated) in the communications device. Further, the potential state of the input/output port 42 is set to a high state (3 V) or a low state (0 V) according to the control signal applied from the CPU. Accordingly, in this example, a changing signal of the potential state of the input/output port 42 becomes the second control voltage signal DC2, and this second control voltage signal DC2 is input to the second control terminal 24b of the variable capacitor 24 through the resistor 14.

In the voltage generation circuit 40 having the above-described configuration, various control voltages can be generated by combining various voltage values output from the voltage source 41 and the potential states set on the input/output port 42. The relationship between the combination of the various voltage values (first control voltage signal DC1) output from the voltage source 41 and the potential states (second control voltage signal DC2) set on the input/output port 42 and the control voltage applied to the variable capacitor 24 is shown in FIGS. 15 and 16.

FIG. 15 is a diagram illustrating the relationship between the combination of the first control voltage signal DC1 and the second control voltage signal DC2 when the control voltage is applied to a variable capacitor 24 in the positive condition and the generated control voltage. Further, FIG. 16 is a diagram illustrating the relationship between the combination of the first control voltage signal DC1 and the second control voltage signal DC2 when the control voltage is applied to a variable capacitor 24 in the negative condition and the generated control voltage. Further, in FIGS. 15 and 16, it is exemplified that the voltage source 41 outputs the voltage signal in the range of 0 V to 3 V. Further, in FIGS. 15 and 16, the control voltage in the positive condition is stated as a positive value, and the control voltage in the negative condition is stated as a negative value.

In this example, if it is intended to apply the control voltage to the variable capacitor 24 in the positive condition, as shown in FIG. 15, the potential state (second control voltage signal DC2) of the input/output port 42 is set to a low state (0 V). Further, in the positive condition, the output voltage value (the first control voltage signal DC1) of the voltage source 41 is variously changed in the range of 0 V to 3 V in a state where the potential state of the input/output port 42 is kept in a low state (0 V). Through this, as shown in FIG. 15, it is possible to change the control voltage that is applied to the variable capacitor 24 in the range of 0 V to 3 V and to set the control voltage in the positive condition to a desired voltage value.

Further, in the case of applying the control voltage to the variable capacitor 24 in the negative condition, as shown in FIG. 16, the potential state (second control voltage signal DC2) of the input/output port 42 is set to a high state (3 V). Further, in the negative condition, the output voltage value (the first control voltage signal DC1) of the voltage source 41 is variously changed in the range of 0 V to 3 V in a state where the potential state of the input/output port 42 is kept in a high state (3 V). Through this, as shown in FIG. 16, it is possible to change the control voltage that is applied to the variable capacitor 24 in the range of 0 V to 3 V and to set the control voltage in the negative condition to a desired voltage value.

Further, in the voltage generation circuit 40 according to this example, by appropriately changing the combination of the output voltage from the voltage source 41 and the potential state of the input/output port 42, it is possible to change (invert) the application operation of the control voltage in the positive condition and the application operation of the control voltage in the negative condition.

As described above, even in this example, for example, by using the voltage generation circuit 40 having the configuration as illustrated in FIG. 14, in the same manner as the above-described embodiment, the application operation of the control voltage in the positive condition and the application operation of the control voltage in the negative condition can be switched. Accordingly, even in this example, the same effect as the above-described embodiment can be obtained.

Further, in this example, in the same manner as the modified example 1, one voltage source may be provided in the voltage generation circuit 40. Further, in this embodiment, in the same manner as the modified example 1, it is not necessary to provide a selection switch in the voltage generation circuit 40. Accordingly, in this example, the voltage generation circuit 40 (communications device) can be configured at low cost and with simple and easy configuration.

MODIFIED EXAMPLE 3

In the above-described embodiment, the voltage value and the pulse width (application time) of the DC pulse voltage of the first control voltage signal DC1 and the voltage value and the pulse width of the DC pulse voltage of the second control voltage signal DC2 are equal to each other. This is because the influences of the hysteresis characteristic (voltage history characteristic) of the variable capacitor when the first control voltage signal DC1 is applied (in the positive condition) is cancelled when the second control voltage signal DC2 is applied (in the negative condition). However, cancellation of the influence of the hysteresis characteristic in the variable capacitor is not limited to this example.

The influence of the hysteresis characteristic by the ferroelectric material is determined by [applied voltage value]× [application time]. Accordingly, the voltage value of the DC pulse voltage of the second control voltage signal DC2 may be larger than that of the first control voltage signal DC1, and the application time of the DC pulse voltage of the second control voltage signal DC2 may be shorter than that of the first control voltage signal DC1. By contrast, the voltage value of the DC pulse voltage of the second control voltage signal DC2 may be smaller than that of the first control voltage signal DC1, and the application time of the DC pulse voltage of the second control voltage signal DC2 may be longer than that of the first control voltage signal DC1.

Even in this case, it is possible to cancel the influence of the hysteresis characteristic of the variable capacitor in the case of applying the first control voltage signal DC1 (in the positive condition) when the second control voltage signal DC2 is applied (in the negative condition), and the same effect as the above-described embodiment can be obtained.

MODIFIED EXAMPLE 4

In the above-described embodiment, the application condition of the control voltage is inverted between the positive condition and the negative condition. However, the present disclosure is not limited thereto. The influence of the hysteresis characteristic or the aging characteristic that occurs in the previous communications period may be canceled in a period except for the communications period, for example, in the standby period. In the modified example 4, an example thereof is shown.

Figure 17:
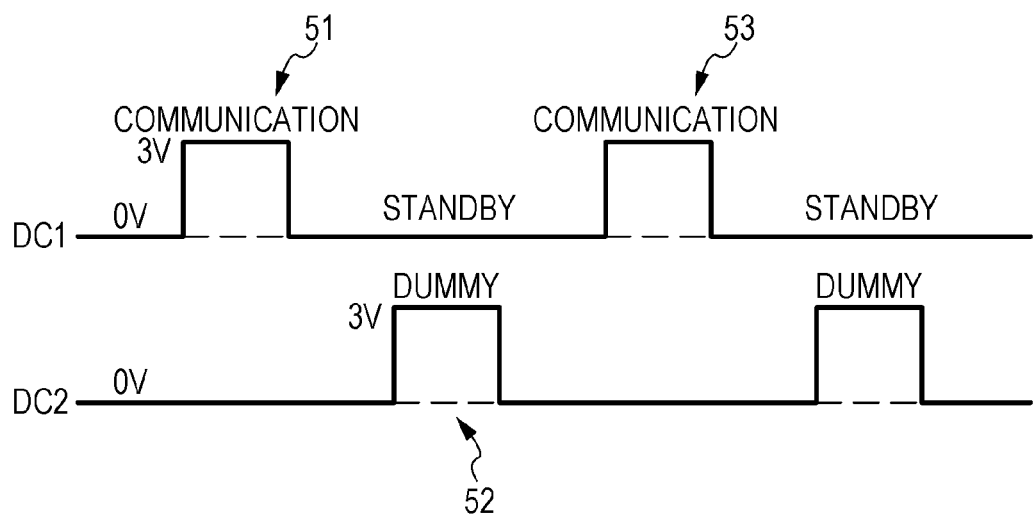
FIG. 17 is a diagram illustrating a method of applying a control voltage according to modified example 4.

FIG. 17 is a diagram illustrating an example of signal waveforms of the first control voltage signal DC1 and the second control voltage signal DC2 used in the modified example 4. In this example, the control voltage is applied as follows.

First, at a predetermined rate, a DC pulse voltage (first control voltage signal DC1) having the amplitude of 3 V to the first control terminal 24a of the variable capacitor 24, and the communications operation is performed (application operation 51 of the DC pulse voltage in FIG. 17) according to the positive condition.

Next, a dummy pulse voltage (second control voltage signal DC2) having the amplitude of 3 V is applied to the second control terminal 24b of the variable capacitor 24 (application operation 52 of the DC pulse voltage in FIG. 17). Through this, the influence of the hysteresis characteristic or the aging characteristic is canceled.

Further, after application of the dummy pulse voltage, according to the next communications operation, the DC pulse voltage (first control voltage signal DC1) having the amplitude of 3 V is applied to the first control terminal 24a of the variable capacitor 24, and the communications operation is performed in the positive condition (application operation 53 of the DC pulse voltage in FIG. 17). Thereafter, the operation after the application operation 52 of the dummy pulse voltage is repeated.

That is, even in the application method of the control voltage in this example, in the same manner as the above-described embodiment, the control voltage is applied in the polarity inversion drive method, and the communications operation is performed only in the positive condition. Further, in order to cancel the influence of the hysteresis characteristic or the aging characteristic occurring in the communications period, the dummy pulse voltage (second control voltage signal DC2) is applied to the variable capacitor in the negative condition.

Further, in the method according to this example, in order to cancel the influences of the hysteresis characteristic or the aging characteristic occurring in the communications period more reliably, it is preferable that the application condition of the dummy pulse voltage (voltage value and the pulse width) may be equivalent to that in the communications period. However, in the method according to this example, the communications operation is unable to be performed in the application period of the dummy pulse voltage, and thus it is preferable that the application time (pulse width) of the dummy pulse voltage be shorter than the communications period. In this case, in order to cancel the influences of the hysteresis characteristic or the aging characteristic occurring in the communications period more reliably, it is preferable that the amplitude of the dummy pulse voltage be larger than the amplitude of the control voltage in the communications period.

Further, in an example illustrated in FIG. 17, the communications operation is performed in the positive condition and the dummy pulse voltage is applied in the negative condition. However, the present disclosure is not limited thereto, and the dummy pulse voltage may be applied in the positive condition, and the communications operation may be performed in the negative condition.

Further, in an example illustrated in FIG. 17, the control voltage in the standby state is 0 V. However, as described above in Table 1, the control voltage during the standby state, for example, is changed according to the condition such as the kind of a communications device. Accordingly, the application condition (voltage value and the pulse width) of the dummy pulse voltage may be appropriately changed according to the condition, for example, such as the kind of communications device or the like.

As described above, according to the method according to this example, in the same manner as the above-described embodiment, the control voltage can be applied to the variable capacitor in the polarity inversion drive method, the same effect as the above-described embodiment can be obtained.

Further, the method according to this example has the following advantages. In the method according to the above-described embodiment, as is clear from the measurement result illustrated in Tables 4 and 5, the time-dependent change characteristic of the capacitance and the variable width of the variable capacitance in the positive condition is slightly different from the time-dependent change characteristic of the capacitance and the variable width in the negative condition. In this case, the variable characteristic of the capacitance of the variable capacitance is slightly changed by the application condition (positive condition or negative condition) of the control voltage.

Through this, in the method according to this example, the application condition of the control voltage during communications can be fixed to one side of the positive polarity condition and the negative polarity condition. Accordingly, in the method according to this embodiment, the variable characteristic of the capacitance of the variable capacitor can be stably controlled for an extended period of time regardless of the difference between time-dependent changes of the capacitance in the positive condition and in the negative condition.

MODIFIED EXAMPLE 5

As described above, in the method according to the above-described embodiment, even if the polarity inversion drive method controls the application method of the control voltage, the time-dependent change of the variable width of the capacitance of the variable capacitor in the positive condition is slightly different from that in the negative condition. Accordingly, in order to cancel the difference in time-dependent change of the variable width between the positive condition and the negative condition, the control voltage may be controlled by the following method.

In this example, first, in the positive condition and the negative position, the characteristics of the capacitance change against various control voltages can be data-based. Then, during the driving of an actual variable capacitor, the control voltage value in the respective polarity conditions is appropriately controlled based on the characteristic data stored in the database so that the variations of the capacitance of the variable capacitance in the positive condition and in the negative position become equal to each other. In the case of using the method according to this example, the variable width of the capacitance of the variable capacitor can be stably controlled for an extended period of time.

MODIFIED EXAMPLE 6

In the above-described embodiment, it is exemplified (for example see FIGS. 6 and 7) that the application condition of the control voltage is inverted in the order of a positive condition, a negative condition, a positive condition, and a negative condition. However, the present disclosure is not limited thereto. The operation order of the application condition of the control voltage is optional if the method can cancel the influence of the hysteresis characteristic or the aging characteristic of the variable capacitor.

For example, the application condition of the control voltage may be inverted in the order of the positive condition, the negative condition, the negative condition, and the positive condition, or may be inverted in the order of the negative condition, the positive condition, the positive condition, and the negative condition.

Further, a series of the positive condition and the negative position may continue a predetermined number of times, invert the application condition, and then a series of the positive condition and the negative condition may continue for a predetermined number of times. For example, it is also possible to invert the application condition of the control voltage in the order of the positive condition, the positive condition, the negative condition, and the negative condition.

However, in the case of applying the control voltage in the above-described order, from the viewpoint of cancelling the influence of the hysteresis characteristic or the aging characteristic of the variable capacitor, in a predetermined period, it is preferable that the number of operations in the positive condition be substantially equal to the number of operations in the negative condition.

Further, from the viewpoint of cancelling the influence of the hysteresis characteristic or the aging characteristics of the variable capacitor, the application condition may be inverted once in a predetermined period. Further, the inversion operation of the application condition of the control voltage may be performed at a predetermined rate or may be performed in the random timing.

MODIFIED EXAMPLE 7

In the above-described embodiment, a voltage source that generates a minus control voltage is not used. However, the present disclosure is not limited thereto. By properly switching a voltage source that generates a plus control voltage and a voltage source that generates a minus control voltage, the above-described polarity inversion drive type control voltage application method may be realized.

MODIFIED EXAMPLE 8

In the above-described embodiment, the control voltage during the standby state is set to 0 V. However the present disclosure is not limited thereto. As described in Table 1, the control voltage during the standby state is changed by the conditions, for example, such as kinds of communications devices. Accordingly, the control voltage during the standby state may be appropriately changed, for example, according to the conditions such as the kinds of communications devices.

MODIFIED EXAMPLE 9

In the above-described embodiment, the polarity inversion drive type control voltage application method is applied to the reception unit of the communications device, for example, such as the information processing terminal that has a non-contact communications function. However, the present disclosure is not limited thereto.

For example, even in the transmission unit of the communications device that has a non-contact communications function, in the case of adjusting the transmission frequency with the variable capacitance using the ferroelectric material, the above-described polarity inversion drive type control voltage application method may be applied to the transmission unit.

Further, the above-described polarity inversion drive type control voltage application method may be applied to a certain communications device so far as the communications device adjusts the resonant frequency of the non-contact communications function with the variable capacitor using the ferroelectric material. For example, the polarity inversion drive type control voltage application method may be applied to the non-contact IC card. In this case, the first control voltage signal DC1 and the second control voltage signal DC2 are generated from the DC voltage that is generated by a rectifying circuit in the non-contact IC card.

Further, the above-described polarity inversion drive type control voltage application method may be applied to, for example, a non-contact power feeding device. In the case where the above-described polarity inversion drive type control voltage application method is applied to the non-contact power feeding device, a long-term stable power feeding operation can be realized.

The present disclosure may take the following configurations.

(1) A communications device including a resonant antenna including a variable capacitance element having a dielectric unit formed of a ferroelectric material, and performing non-contact communications with the outside; and a control voltage generation unit generating a control voltage for controlling capacitance of the variable capacitance element, applying the generated control voltage to the dielectric unit of the variable capacitance element, and inverting an application direction of the control voltage applied to the dielectric unit at a predetermined rate.

(2) The communications device as described in (1), wherein at least one of a first control voltage applying operation just before the timing for inverting the application direction of the control voltage and a second control voltage applying operation just after the timing is the non-contact communications with the outside.

(3) The communications device as described in (2), wherein both the first control voltage applying operation and the second control voltage applying operation are the non-contact communications with the outside.

(4) The communications device as described in (2), wherein the first control voltage applying operation is the non-contact communications with the outside, and the second control voltage applying operation is an operation except for the non-contact communications with the outside.

(5) The communications device as described in any one of (2) to (4), wherein the control voltage generation unit inverts the application direction of the control voltage and performs the second control voltage applying operation a predetermined number of times after performing the first control voltage applying operation a predetermined number of times.

(6) The communications device as described in (5), wherein the predetermined number of times is once.

(7) The communications device as described in any one of (2) to (6), wherein a period of the first control voltage applying operation and a period of the second control voltage applying operation are equal to each other.

(8) The communications device as described in any one of (2) to (6), wherein a period of the second control voltage applying operation is shorter than a period of the first control voltage applying operation.

(9) A resonant circuit including a variable capacitance element having a dielectric unit formed of a ferroelectric material; and a control voltage generation unit generating a control voltage for controlling capacitance of the variable capacitance element, applying the generated control voltage to the dielectric unit of the variable capacitance element, and inverting an application direction of the control voltage applied to the dielectric unit at a predetermined rate.

(10) A method of applying a control voltage in a communications device having a variable capacitance element having a dielectric unit formed of a ferroelectric material, and a control voltage generation unit generating a control voltage for controlling capacitance of the variable capacitance element and applying the generated control voltage to the dielectric unit of the variable capacitance element, the method including applying, by the control voltage generation unit, a first control voltage to the dielectric unit in a predetermined direction; and applying, by the control voltage generation unit, a second control voltage through inverting an application direction of the control voltage at a predetermined rate after applying the first control voltage in the predetermined direction.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A communications device comprising:
    a resonant antenna including a variable capacitance element having a dielectric unit formed of a ferroelectric material, and performing non-contact communications with the outside; and
    a control voltage generation unit generating a control voltage for controlling capacitance of the variable capacitance element, applying the generated control voltage to the dielectric unit of the variable capacitance element, and inverting an application direction of the control voltage applied to the dielectric unit at a predetermined rate, wherein at least one of a first control voltage applying operation just before a timing for inverting the application direction of the control voltage and a second control voltage applying operation just after the timing is the non-contact communications operation with the outside.

2. The communications device according to claim 1, wherein both the first control voltage applying operation and the second control voltage applying operation are the non-contact communications operation with the outside.

3. The communications device according to claim 1, wherein the first control voltage applying operation is the non-contact communications operation with the outside, and the second control voltage applying operation is an operation except for the non-contact communications operation with the outside.

4. The communications device according to claim 1, wherein the control voltage generation unit inverts the application direction of the control voltage and performs the second control voltage applying operation a predetermined number of times after performing the first control voltage applying operation a predetermined number of times.

5. The communications device according to claim 4, wherein the predetermined number of times is once.

6. The communications device according to claim 1, wherein a period of the first control voltage applying operation and a period of the second control voltage applying operation are equal to each other.

7. The communications device according to claim 1, wherein a period of the second control voltage applying operation is shorter than a period of the first control voltage applying operation.

8. The communication device according to claim 1, further comprising a signal processing unit operable to perform a predefined process on a received alternating current (AC) signal.

9. The communication device according to claim 1, wherein the resonant antenna comprises a resonant coil and a resonant capacitor.

10. A resonant circuit comprising:
    a variable capacitance element having a dielectric unit formed of a ferroelectric material; and
    a control voltage generation unit generating a control voltage for controlling capacitance of the variable capacitance element, applying the generated control voltage to the dielectric unit of the variable capacitance element, and inverting an application direction of the control voltage applied to the dielectric unit at a predetermined rate, wherein at least one of a first control voltage applying operation before a timing for inverting the application direction of the control voltage and a second control voltage applying operation after the timing corresponds to the non-contact communications operation with the outside.

11. The resonant circuit according to claim 10, wherein both the first control voltage applying operation and the second control voltage applying operation correspond to the non-contact communications operation with the outside.

12. The resonant circuit according to claim 10, wherein the first control voltage applying operation is the non-contact communications operation with the outside, and the second control voltage applying operation is an operation except for the non-contact communications operation with the outside.

13. The resonant circuit according to claim 10, wherein the control voltage generation unit inverts the application direction of the control voltage and performs the second control voltage applying operation a predetermined number of times after performing the first control voltage applying operation a predetermined number of times.

14. The resonant circuit according to claim 13, wherein the predetermined number of times is once.

15. The resonant circuit according to claim 10, wherein a period of the first control voltage applying operation and a period of the second control voltage applying operation are equal to each other.

16. The resonant circuit according to claim 10, wherein a period of the second control voltage applying operation is shorter than a period of the first control voltage applying operation.

17. A method of applying a control voltage comprising:
    in a communications device including a variable capacitance element having a dielectric unit formed of a ferroelectric material, and a control voltage generation unit generating a control voltage for controlling capacitance of the variable capacitance element:
    applying, by the control voltage generation unit, a first control voltage to the dielectric unit in a predetermined direction; and
    applying, by the control voltage generation unit, a second control voltage through inverting an application direction of the control voltage at a predetermined rate after applying the first control voltage in the predetermined direction, wherein at least one of a first control voltage applying operation before a timing for inverting the application direction of the control voltage and a second control voltage applying operation after the timing corresponds to the non-contact communications operation with the outside.

\* \* \* \* \*